Patented Dec. 5, 1939

2,182,721

UNITED STATES PATENT OFFICE 2,182,721

AZO DYESTUFFS AND THEIR MANUFACTURE

Achille Conzetti, Basel, Switzerland, assignor to the firm J. R. Geigy A. G., Basel, Switzerland No Drawing. Application June 8, 1938, Serial No. 212,580. In Switzerland June 14, 1937

8 Claims. (Cl. 260—169)

This invention relates to the manufacture of azo dyestuffs, and has for its object the production of orange, bright red, or yellowish to reddish brown dyestuffs having valuable properties, notably those that their dyeings on silk or wool possess a pure colour shade, an excellent fastness to light, a good fastness to alkaline and acid fulling and a very good fastness to sea water.

According to the process of the present invention a diazotized mono-amino-di- or tri-phenyl-mono- or di-ether (which can be suitably substituted, more particularly by sulphonic acid groups) is coupled with any middle component, the obtained mono-azo dyestuff (which can be again coupled with the same or a different middle component and again diazotized) is diazotized, combined with a phenol capable of being coupled in a p-position, and the resulting dyestuff is subsequently treated with an aromatic sulphonic acid chloride.

The following examples illustrate the invention.

Example 1

13.95 kg. of 2'-methyl-2-aminodiphenylether-4-sulphonic acid are diazotized indirectly, that is to say by allowing the nitrite-containing sodium salt solution to run into hydrochloric acid. The diazo compound is added to a solution of 29.55 kg. of 2:8-aminonaphthol-3:6-disulphonic acid (79%), dissolved in 200 l. of water and 20 kg. of calcined soda.

The coupling being completed, the mass is made congo acid by means of hydrochloric acid, salted out with 20% of common salt, calculated by volume, and the separated mono-azo dyestuff filtered off. The press cakes are dissolved slightly alkaline to litmus in the necessary quantity of water, the necessary quantity of nitrite is added thereto and the whole allowed to run into ice-cooled hydrochloric acid. Up to the completion of the diazotizing, stirring is effected for some hours at 0-5° C., then there are added 5.5 kg. of phenol, the mineral acid is neutralized by means of cold dilute soda lye and a solution of 17 kg. of anhydrous soda in 80 l. of water of 10° C. is poured in. After the completion of the formation of the dyestuff the whole is heated to 70° C., 7.0 kg. of soda lye of 34.8% are added, the temperature is increased to 80° C., and the solution is treated with 14 kg. of p-toluene-sulphochloride. The temperature of 80° C. is maintained for half an hour. The finished dyestuff is salted out with 120 kg. of common salt, filtered and dried.

The dyestuff is a bright red powder, its clear red wool dyeings being characterized by an excellent fastness to light and a good fastness to acid fulling.

Example 2

13.25 kg. of 2-aminodiphenylether-4-sulphonic acid are indirectly diazotized in the same way as indicated in Example 1 and the diazo compound is allowed to run into a solution of 13.85 kg. of 2:8-aminonaphthol-6-sulphonic acid (87%) in 100 l. of water and 18 kg. of calcined soda at 0° C. The mono-azo dyestuff obtained in form of a brick-red precipitate is again dissolved litmus-alkaline, after filtration, in 200 l. of water with the necessary quantity of soda, the necessary quantity of nitrite added thereto and the whole is allowed to run into 20 l. of concentrated hydrochloric acid mixed with ice water. After diazotizing out there are added 6.2 kg. of m-cresol, the mineral acid is neutralized with cold dilute soda lye and a solution of 17 kg. of anhydrous soda of a temperature of about 10° C., is poured in. The disazo dyestuff thus obtained is salted out, then again dissolved in 400 l. of water and heated, after the addition of 10 kg. of calcined soda, to 80° C. At this temperature there are added 14 kg. of p-toluene-sulphochloride. After completion of the acylation the separated dyestuff is filtered off and dried. It constitutes a bright red powder of which the fiery red wool dyeings are characterized by their excellent fastness to light, their very good fastness to acid fulling, their very good fastness to sea water and SO₂.

For the production of the diazo compounds it is also possible to use aminodiphenylether-sulphonic acids other than those mentioned in Examples 1 and 2, for example there may be mentioned 4'-chloro-2-aminodiphenylether - 4 - sulphonic acid, 2':4'-dichloro-6'-methyl-2-aminodiphenylether - 4 - sulphonic acid, 4'-phenoxy-2-aminodiphenylether-4-sulphonic acid, 4'':3'-dichloro-4'-phenoxy-2-aminodiphenylether- 4-sulphonic acid, 4'-isoamyl-2-aminodiphenylether-4-sulphonic acid, 3':5'-dimethyl-2-aminodiphenylether - 4 - sulphonic acid, 4-aminodiphenylether - 3 - sulphonic acid, 2'-methyl - 4 - nitro-2-aminodiphenylether - 6 - sulphonic acid, 4'-phenylazo - 2 - aminodiphenylether-4-sulphonic acid, 4''-amino-4'-phenylaminodiphenylether-2''-sulphonic acid, and 4'-phenyl-2-aminodiphenylether-4-sulphonic acid.

The new aminodiphenylether-sulphonic acids amongst the above enumerated compounds can be produced by the usual processes for the known compounds. It is also possible to use with advantage those aminodiphenylether-sulphonic acids which are obtained by the condensation of p-nitro-chlorobenzene-o-sulphonic acid with the corresponding hydroxyl compounds and subsequent reduction.

Example 3

11.75 kg. of 2'-methyl-4-chloro-2-aminodiphenylether are diazotized as usual, the diazo compound is gradually added to a cold solution of 20.35 kg. of 2:8-aminonaphthol-3:6-disulphonic acid (79%) in 150 l. of water and 20 kg. of anhydrous soda. The separated dyestuff is filtered off, again dissolved litmus alkaline with soda in 300 l. of water, the necessary quantity of sodium nitrite added thereto, diazotized as in Example 1 and coupled with 5.5 kg. of phenol and subsequently treated with p-toluene-sulphochloride.

The finished dyestuff constitutes a bright red powder of which the red wool dyeings possess excellent fastness to light and practically sufficient fastness to sea water.

Instead of the above mentioned diazo compound it is also possible to use with advantage those which are derived from aminodiphenylethers, which can be obtained by condensation of nitrochlorobenzenes, such as o- and p-nitro-chlorobenzene, 2:4-, 2:5- or 3:4-dichloronitrobenzene with aromatic hydroxyl compounds. Amongst the latter may be mentioned by way of example phenols, halogenated phenols, isoamylphenol, oxydiphenylethers, and their substitution products, oxydiphenyl, and p-oxyazobenzene etc.

In the above three examples the middle components may be replaced by other aminonaphthol-mono-and -di-sulphonic acids, such as for example by the 2:5-aminonaphthol -7-sulphonic acid or 1:7-disulphonic acid, and the 1:8-aminonaphthol-2:4-disulphonic acid.

Example 4

69.75 kg. of 2'-methyl-4-aminodiphenylether-2-sulphonic acid are diazotized as usual and the diazo compound is added to a litmus acid solution of 64.75 kg. Cleve's acid (mixture of 1:6- and 1:7-naphthylamine sulphonic acid, 92%) in 1.000 liter of water and 12.5 kg. of soda. The reaction mass is stirred at 15° C. until the diazo compound has disappeared, then it is made litmus alkaline by means of soda lye and the mono-azo dyestuff is salted out with 800 kg. of common salt. The press cakes are dissolved litmus alkaline in 1.500 l. of water with the necessary quantity of alkali, nitrite is added thereto and the whole is allowed to run into 115 kg. of concentrated hydrochloric acid which has been diluted by means of ice and water. Into the obtained brown diazo compound there is allowed to run an aqueous solution of 27.5 kg. of phenol, the mineral acid is neutralized with a cold dilute soda lye and finally it is made alkaline with a cold solution of 80 kg. of anhydrous soda. The disazo dyestuff is then subsequently treated according to the above indications with p-toluene-sulphochloride.

The dyestuff, a yellow-brown powder, yields on wool orange dyeings of excellent fastness to light, the acid and alkaline fulling thereof is also very good and there may be further mentioned the good neutral drawing power, the fastness to $SO_2$ and sea water.

Instead of the diazo compound in Example 4 there may also be used all ether sulphonic acids as they are indicated in Example 2.

Example 5

16.6 kg. of 2'-methyl-2-aminodiphenylether-4-sulphonic acid (83.7%) are diazotized as usual and coupled with 12 kg. of Cleve's acid-mixture (94.5%) as in Example 4. The isolated mono-azo dyestuff is dissolved, diazotized and allowed to run into 12 kg. of Cleve's acid-mixture (94.5%) which has been dissolved litmus acid with soda in water. The mineral acid reaction is neutralized with acetate, on the following day it is made litmus alkaline with soda and the disazo dyestuff is isolated by salting out. The press cakes are again dissolved litmus alkaline in 300 l. of water, treated with the necessary quantity of nitrite and allowed to flow into 25 kg. of hydrochloric acid diluted with ice. After stirring for several hours there are introduced into the dark red-brown diazo compound 5.5 kg. of phenol, the mineral acid reaction is neutralized with ice cold soda lye and there is poured in a solution of 16 kg. of anhydrous soda. The next morning the completely formed trisazo dyestuff is salted out and at the end again subsequently treated as in the above examples with 15 kg. of p-toluene-sulphochloride. The finished dyestuff is isolated as usual. It is a dark brown powder yielding red-brown dyeings which exhibit an excellent fastness to light. In addition to a good acid and alkaline fulling there may also be noted their leveling power and their very good fastness to sea water.

Instead of the diazo compound of Example 5 there may also be used aminophenol ethers, but care must be taken that the resulting dyestuff does not become too difficultly soluble. For example there may be used 6-methyl-2':4':4-trichloro-2-aminodiphenylether or the 2'-methyl-4-nitro-2-aminodiphenylether.

Example 6

The mono-azo dyestuff from 16.6 kg. of 2'-methyl-2-aminodiphenylether-4-sulphonic acid (83.7%) and 12.1 kg. of Cleve's acid mixture (92%) is salted out after diazotizing as indicated in Example 5, filtered and impasted with 400 l. of ice-water. This suspension is allowed to run into a solution of 6.9 kg. of cresidine in 150 l. of water and 7 kg. of concentrated hydrochloric acid, 10 kg. of the sodium salt of β-naphthalene-sulphonic acid are added thereto to facilitate the coupling and cold acetate solution is allowed to run in within some hours up to congo neutrality. Then salting out is carried out by means of 200 kg. of common salt, the disazo dyestuff is again dissolved after filtering in 300 l. of water, which contains the necessary quantity of nitrite, then cooled by addition of ice and 40 kg. of concentrated hydrochloric acid are poured in. After completion of the diazotizing there are added 5.5 kg. of phenol, the mineral acid is neutralized by means of cooled soda lye and the necessary quantity of carbonate is poured in. After the formation of the trisazo dyestuff, the same is isolated and treated in the usual manner, as for example indicated in Example 2, with an aromatic sulphonic acid chloride such as for example toluene-sulphochloride.

The dyestuff, a brown powder, yields on wool brown dyeings which are very fast to light and there may further be mentioned the good leveling power and the very good fastness to sea water.

Instead of cresidine there may also be used in the above example other aminobenzene derivatives capable of being coupled in the p-position, for example m-toluidine, p-xylidine, amino-hydroquinone-dialkyl and -dioxalkyl ethers. For the production of the first diazo compound there may be used with advantage all acids which are specified in Example 2.

Example 7

16.6 kg. of 2'-methyl-2-aminodiphenylether-4-sulphonic acid (83.7%) are diazotized in accordance with the indications of Example 1 and coupled with a solution of 6.92 kg. of cresidine in 200 l. of water and 8 kg. of concentrated hydrochloric acid. In the course of the day there is added an acetate solution until the congo acid reaction disappears. Then filtering is effected, again dissolved litmus alkaline in 400 l. of water, nitrite is added and diazotizing performed by pouring in 30 l. of concentrated hydrochloric acid. The diazo compound after isolation in the usual way, is introduced into a litmus acid solution of 11.8 kg. of Cleve's acid-mixture (94.5%) in 200 l. of water. By addition of 10 kg. of the sodium salt of β-naphthalene sulphonic acid the coupling is facilitated, the mineral acid thereof being neutralized by means of 10 kg. of crystalline sodium acetate. After the dark violet reaction mass has been made litmus alkaline with soda, salting out is effected with 140 kg. of common salt and the product is isolated. The disazo dyestuff is diazotized according to known methods, coupled with phenol as in the above examples and finally acylated with p-toluene-sulphochloride.

The dyestuff is a brown powder yielding on wool dyeings which possess a very excellent fastness to light. The same are further characterized by the uniformity of the dyeing and by a very good fastness to sea water. Instead of the cresidine used in the above example it is also possible to use other middle components of the benzene series; instead of the diazo component others can also be used such as for example the amino-diphenylether sulphonic acids specified in Example 2.

If instead of the p-toluene-sulphochloride employed in the Examples 1 to 7 another sulphochloride of the benzene series is used, for example benzene- or para-chlorobenzene-sulphochloride, dyestuffs with similar properties are obtained.

What I claim is:

1. Azo dyestuffs of the following general formula

A—N=N—B—N=N—C wherein
A means an aromatic radical containing at least two benzene nuclei connected by an oxygen bridge,
B means a divalent radical selected from the group consisting of radicals of the benzene and naphthalene series, A and B containing at least two sulphonic acid groups, and
C means the radical of a phenol coupled in the para-position, bearing at the oxygen atom the radical —SO₂D, wherein D represents an aromatic radical of the benzene series, being orange to bright red to yellowish- and reddish-brown dyestuffs whose dyeings are characterized by a pure color shade, an excellent fastness to light, a good fastness to alkaline and acid fulling and a very good fastness to sea water.

2. Azo dyestuffs of the following formula

A—N=N—B—N=N—C wherein
A means an aromatic radical of the benzene series containing in the ortho position to the azo group a phenoxy group,
B means a divalent radical selected from the group consisting of radicals of the benzene and naphthalene series, A and B containing at least two sulphonic acid groups, and
C means the radical of a phenol coupled in the para-position, bearing at the oxygen atom the radical

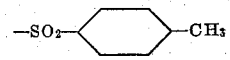

being orange to bright red to yellowish- and reddish-brown dyestuffs whose dyeings are characterized by a pure color shade, an excellent fastness to light, a good fastness to alkaline and acid fulling and a very good fastness to sea water.

3. Azo dyestuffs of the following formula

A—N=N—B—N=N—C wherein
A means an aromatic radical of the benzene series containing in the para-position to the azo group a phenoxy group,
B means a divalent radical selected from the group consisting of radicals of the benzene and naphthalene series, A and B containing at least two sulphonic acid groups, and
C means the radical of a phenol coupled in the para-position, bearing at the oxygen atom the radical

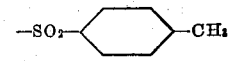

being orange to bright red to yellowish- and reddish-brown dyestuffs whose dyeings are characterized by a pure color shade, an excellent fastness to light, a good fastness to alkaline and acid fulling and a very good fastness to sea water.

4. Azo dyestuffs of the following formula

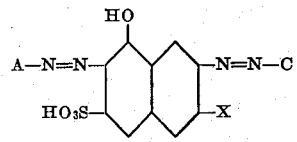

wherein
A means an aromatic radical containing at least two benzene nuclei connected by an oxygen bridge,
X represents one of the group consisting of H and SO₃H, and
C means the radical of a phenol coupled in the para-position, bearing at the oxygen atom the radical —SO₂D, wherein D represents an aromatic radical of the benzene series, being orange to bright red to yellowish- and reddish-brown dyestuffs whose dyeings are characterized by a pure color shade, an excellent fastness to light, a good fastness to alkaline and acid fulling and a very good fastness to sea water.

5. The azo-dyestuff having in the free state the following formula

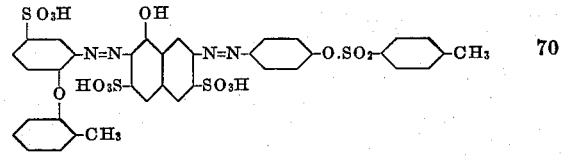

being a bright red powder, its clear red dyeings on wool being characterized by an excellent fastness to light and a good fastness to acid fulling.

6. The azo dyestuff having in the free state the following formula

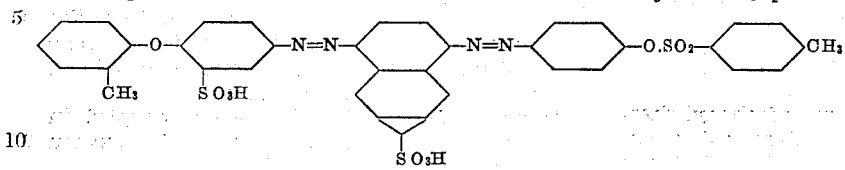

being a yellow-brown powder, its orange dyeings on wool being of an excellent fastness to light, of a very good fastness to acid and alkaline fulling, of a good fastness to $SO_2$— and sea water.

7. The azo dyestuff having in the free state the following formula

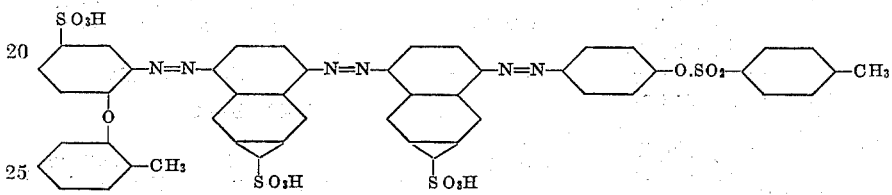

being a dark brown powder, its red-brown even dyeings being of an excellent fastness to light, of a good fastness to acid and alkaline fulling and of a very good fastness to sea water.

8. A process for the manufacture of azo dyestuffs, comprising diazotizing an amino-diphenyl-ether of the benzene series, coupling with a primary amine capable of coupling in the para position, selected from the group consisting of amines of the benzene and naphthalene series the diazo and the azo component being so selected that at least two sulphonic acid groups will be present, re-diazotizing the azo dyestuff and coupling in alkaline medium with a phenol of the benzene series capable of coupling in the para-position and acylating the disazo dyestuff with para-toluene-sulphochloride.

ACHILLE CONZETTI.